(12) United States Patent
Harada et al.

(10) Patent No.: US 7,593,173 B2
(45) Date of Patent: Sep. 22, 2009

(54) CORRECTOR RING DRIVING DEVICE OF MICROSCOPIC OBJECTIVE LENS PROVIDED WITH CORRECTOR RING

(75) Inventors: Mitsuo Harada, Hachioji (JP); Yoshihiro Shimada, Sagamihara (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 12/041,924

(22) Filed: Mar. 4, 2008

(65) Prior Publication Data
US 2008/0225416 A1 Sep. 18, 2008

(30) Foreign Application Priority Data
Mar. 12, 2007 (JP) .............................. 2007-062423

(51) Int. Cl.
*G02B 7/02* (2006.01)
*G02B 21/00* (2006.01)
*G02B 21/02* (2006.01)
*G02B 21/06* (2006.01)

(52) U.S. Cl. ........................ 359/821; 359/813; 359/381; 359/384; 359/368; 359/390; 359/656

(58) Field of Classification Search ................. 359/813, 359/821, 830, 381–385, 387–390, 363, 368, 359/376, 656, 365, 392, 726, 727; 396/73, 396/74, 298, 432, 253; 351/205, 233, 236, 351/214, 216, 221; 355/53, 56, 68
See application file for complete search history.

(56) References Cited

U.S. PATENT DOCUMENTS

| 1,817,642 | A | * | 8/1931 | Ott ............................. 359/821 |
| 2,264,835 | A | * | 12/1941 | Flint .......................... 359/381 |
| 3,934,960 | A | * | 1/1976 | Ouchi et al. ................ 359/390 |
| 4,946,265 | A | * | 8/1990 | Shimizu et al. ............. 359/381 |
| 5,337,177 | A | * | 8/1994 | Toyoda et al. .............. 359/384 |
| 5,508,850 | A | | 4/1996 | Noguchi ..................... 359/821 |
| 5,719,699 | A | * | 2/1998 | Otomo ....................... 359/368 |
| 6,133,561 | A | * | 10/2000 | Toshimitsu et al. ........ 250/201.3 |

(Continued)

FOREIGN PATENT DOCUMENTS

JP 2002-169101 6/2002

(Continued)

OTHER PUBLICATIONS

European Search Report dated Jul. 9, 2008 for Appln. No. 08002761. Aug. 2217.

*Primary Examiner*—Loha Ben
(74) *Attorney, Agent, or Firm*—Pillsbury Winthrop Shaw Pittman, LLP (57) ABSTRACT

A device driving a corrector ring of a corrector ring mounting objective lens mounted to an objective mounting and dismounting section of a revolver includes a rotation driving mechanism having a motor and a turning effort transmitting section which transmits a turning effort of the motor to the corrector ring of the corrector ring mounting objective lens mounted to the revolver to drive the corrector ring; and a connection unit for connecting the turning effort transmitting section to the corrector ring of the corrector ring mounting objective lens introduced into an observation optical path in association with a switching operation performed by the revolver and disconnecting the turning effort transmitting section from the corrector ring of the corrector ring mounting objective lens removed from the observation optical path.

17 Claims, 7 Drawing Sheets

U.S. PATENT DOCUMENTS

| | | | |
|---|---|---|---|
| 6,313,944 B2 * | 11/2001 | Kawahito | 359/388 |
| 6,366,398 B1 * | 4/2002 | Ouchi | 359/381 |
| 6,404,546 B2 * | 6/2002 | Toyoda et al. | 359/392 |
| 6,636,353 B2 * | 10/2003 | Yamaguchi et al. | 359/381 |
| 6,697,196 B2 * | 2/2004 | Suzuki | 359/385 |
| 6,733,128 B2 * | 5/2004 | Kirchhuebel | 351/205 |
| 6,813,071 B2 * | 11/2004 | Takahama | 359/381 |
| 7,061,672 B2 * | 6/2006 | Faber | 359/381 |
| 7,440,184 B2 * | 10/2008 | Takeuchi | 359/381 |

FOREIGN PATENT DOCUMENTS

| | | |
|---|---|---|
| JP | 2002169101 | 6/2002 |
| JP | 2004-138898 | 5/2004 |
| JP | 2005-017454 | 1/2005 |
| JP | 2005-17643 | 1/2005 |

\* cited by examiner

(12) United States Patent
US 7,593,173 B2

CORRECTOR RING DRIVING DEVICE OF MICROSCOPIC OBJECTIVE LENS PROVIDED WITH CORRECTOR RING

This application claims benefits of Japanese Application No. 2007-62423 filed in Japan on Mar. 12, 2007, the contents of which are incorporated herein by reference.

BACKGROUND OF THE INVENTION

1. Field of the Invention

This invention relates to a corrector ring driving device of a microscopic objective lens provided with a corrector ring.

2. Description of Related Art

With the purpose of correcting aberration caused by variation of the thickness of a sample (specimen) vessel or a cover member in microscopy, a microscopic objective lens with a corrector ring (or a correction collar) mechanism (a corrector ring mounting objective lens) adjusting an internal lens position has been known. In a conventional microscope, a structure for driving the corrector ring of the corrector ring mounting objective lens is proposed, for example, by Japanese Patent Kokai No. 2002-169101.

Figure 1:
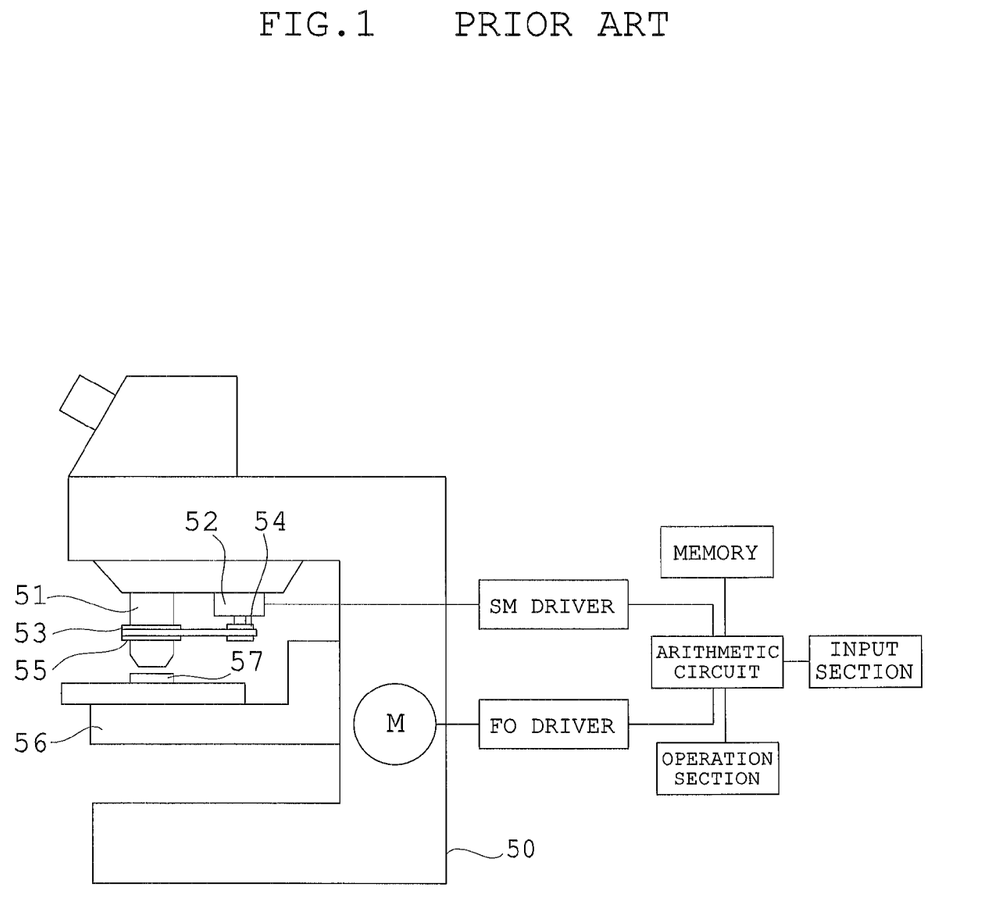
FIG. 1 is an explanatory view showing schematically a microscope provided with the structure for driving the corrector ring set forth in Kokai No. 2002-169101.

FIG. 1 shows schematically a microscope provided with the structure for driving the corrector ring set forth in Kokai No. 2002-169101. The structure for driving the corrector ring in a microscope 50 is such that the corrector ring (not shown) of a corrector ring mounting objective lens 51 and the shaft of a stepping motor 52 for turning the corrector ring are provided with pulleys 53 and 54, respectively, to which a belt 55 is connected, and the turning effort of the stepping motor 52 is transmitted to the corrector ring through the pulleys 53 and 54 and the belt 55 connected to the pulleys to turn the corrector ring. Also, in FIG. 1, reference numeral 56 represents a stage and 57 represents a sample (specimen) placed on the stage 56.

SUMMARY OF THE INVENTION

The corrector ring driving device of the microscopic objective lens provided with the corrector ring according to the present invention is adapted to drive the corrector ring of a corrector ring mounting objective lens mounted to an objective switching device that has a plurality of mounting and dismounting sections for mounting and dismounting a plurality of kinds of objective lenses, to each of which is mounted the corrector ring mounting objective lens, and allows a desired objective lens to be introduced into an observation optical path by rotating on a shaft fixed to a microscope body. The corrector ring driving device comprises a rotation driving mechanism having a motor and a turning effort transmitting section which transmits the turning effort of the motor to the corrector ring of the corrector ring mounting objective lens mounted to the objective switching device to drive the corrector ring. The rotation driving mechanism is constructed to connect the turning effort transmitting section to the corrector ring of the corrector ring mounting objective lens introduced into the observation optical path in a switching operation performed by the objective switching device and to disconnect the turning effort transmitting section from the corrector ring of the corrector ring mounting objective lens removed from the observation optical path.

The corrector ring driving device of the microscopic objective lens provided with the corrector ring according to the present invention is adapted to drive the corrector ring of a corrector ring mounting objective lens mounted to an objective switching device that has a plurality of mounting and dismounting sections for mounting and dismounting a plurality of kinds of objective lenses, to each of which is mounted the corrector ring mounting objective lens, and allows a desired objective lens to be introduced into an observation optical path by rotating on a shaft fixed to a microscope body. The corrector ring driving device comprises a rotation driving mechanism having a motor and a turning effort transmitting section which transmits the turning effort of the motor to the corrector ring of the corrector ring mounting objective lens mounted to the objective switching device to drive the corrector ring; and a connection means for connecting the turning effort transmitting section to the corrector ring of the corrector ring mounting objective lens introduced into the observation optical path in association with a switching operation performed by the objective switching device and disconnecting the turning effort transmitting section from the corrector ring of the corrector ring mounting objective lens removed from the observation optical path.

In the corrector ring driving device of the microscopic objective lens provided with the corrector ring according to the present invention, it is desirable that an annular member having a spur gear portion is provided to be mountable with respect to the corrector ring of the corrector ring mounting objective lens and the turning effort transmitting section has a gear portion engaging with the spur gear portion of the annular member mounted to the corrector ring of the corrector ring mounting objective lens along a direction of rotation and a disengagement portion disengaging the gear portion from the spur gear portion of the annular member.

In the corrector ring driving device of the microscopic objective lens provided with the corrector ring according to the present invention, it is desirable that the connection means controls the amount of rotation of the motor so that when the corrector ring mounting objective lens is introduced into the observation optical path, the gear portion of the turning effort transmitting section engages with the spur gear portion of the annular member mounted to the corrector ring of the corrector ring mounting objective lens, while when the corrector ring mounting objective lens is removed from the observation optical path, the spur gear portion of the annular member mounted to the corrector ring of the corrector ring mounting objective lens is disengaged through the disengagement portion of the turning effort transmitting section.

In the corrector ring driving device of the microscopic objective lens provided with the corrector ring according to the present invention, it is desirable that the turning effort transmitting section has a rotary roller constructed of an elastic member and the connection means is constructed so that the rotary roller is pressed against the corrector ring of the corrector ring mounting objective lens.

In the corrector ring driving device of the microscopic objective lens provided with the corrector ring according to the present invention, it is desirable that the turning effort transmitting section has a pressure exerting portion pressed against the corrector ring of the corrector ring mounting objective lens along a direction of rotation and a pressure release portion releasing a pressure on the corrector ring.

In the corrector ring driving device of the microscopic objective lens provided with the corrector ring according to the present invention, it is desirable that the connection means controls the amount of rotation of the motor so that when the corrector ring mounting objective lens is introduced into the observation optical path, the pressure exerting portion of the turning effort transmitting section is pressed against the corrector ring of the corrector ring mounting objective lens, while when the corrector ring mounting objective lens is removed from the observation optical path, the pressure on the corrector ring of the corrector ring mounting objective lens is released through the pressure release portion of the turning effort transmitting section.

In the corrector ring driving device of the microscopic objective lens provided with the corrector ring according to the present invention, it is desirable that the rotation driving mechanism is constructed to be mountable and dismountable with respect to each of the mounting and dismounting sections of the objective switching device.

In the corrector ring driving device of the microscopic objective lens provided with the corrector ring according to the present invention, it is desirable that the rotation driving mechanism is secured to a shaft fixed to a microscope body which is the center of rotation of the objective switching device.

In the corrector ring driving device of the microscopic objective lens provided with the corrector ring according to the present invention, it is desirable that the rotation driving mechanism is supported by a support independent of the objective switching device.

In the corrector ring driving device of the microscopic objective lens provided with the corrector ring according to the present invention, it is desirable that the support is constructed of an elastic member fixed to the microscope body.

In the corrector ring driving device of the microscopic objective lens provided with the corrector ring according to the present invention, it is desirable that the support is constructed to be movable and the connection means has a travel control means making the support movable with respect to positions where the turning effort transmitting section is connected to, and disconnected from, the corrector ring of the corrector ring mounting objective lens introduced into, and removed from, the observation optical path in association with a switching operation performed by the objective switching device.

According to the corrector ring driving device of the microscopic objective lens provided with the corrector ring of the present invention, it is possible that the exchange of a corrector ring mounting objective lens and the introduction of the objective lens into the observation optical path is facilitated even in a state where the corrector ring mounting objective lens is mounted to a revolver, the working load of a viewer is lessened, and the corrector ring is automatically driven.

These and other features and advantages of the present invention will become apparent from the following detailed description of the preferred embodiments when taken in conjunction with the accompanying drawings.

DETAILED DESCRIPTION OF THE PREFERRED EMBODIMENTS

First Embodiment

Figure 2A:
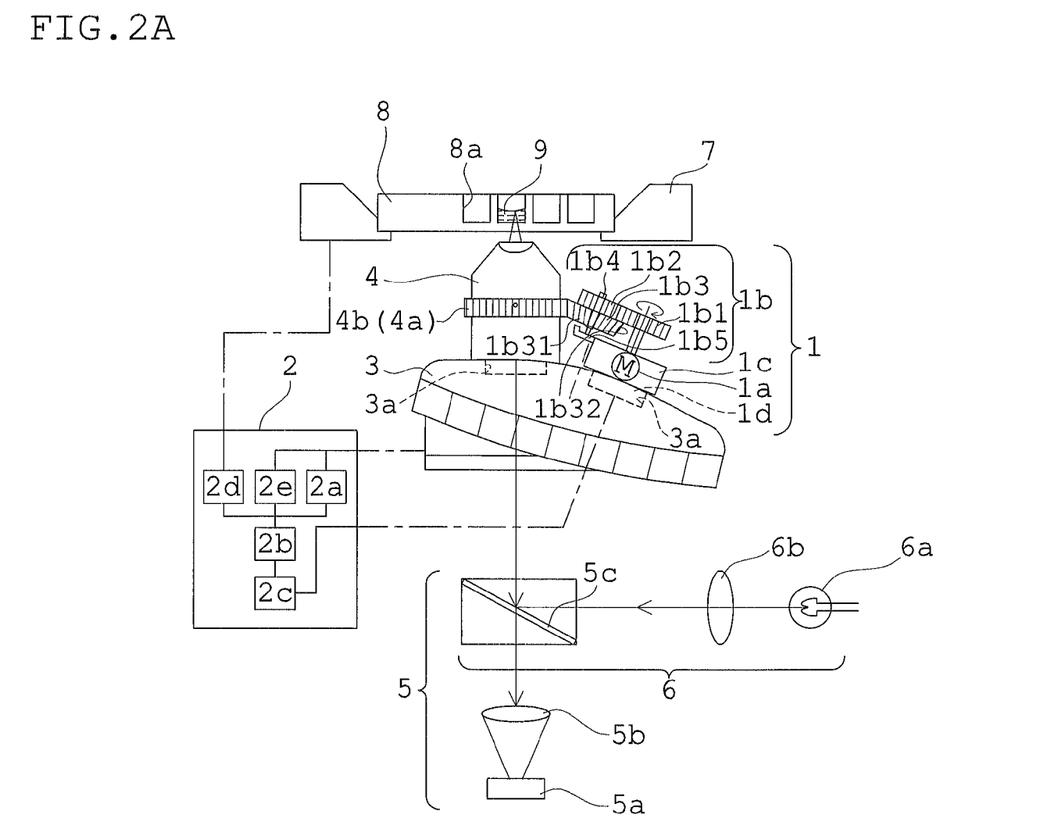
FIG. 2A is a view showing schematically the essential parts, viewed from the side, of a corrector ring driving device of a microscopic objective lens provided with a corrector ring according to a first embodiment of the present invention.
Figure 2B:
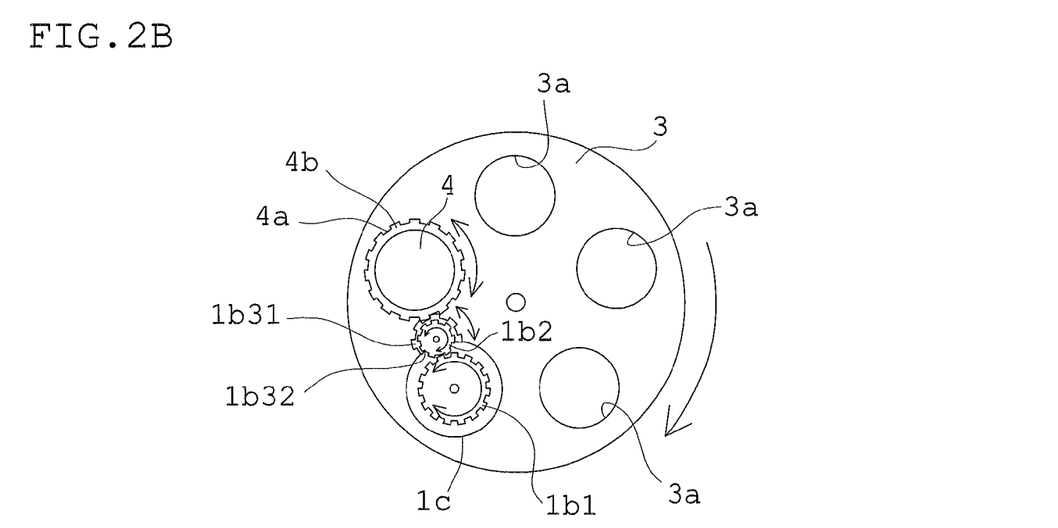
FIG. 2B is a plan view showing the positional relationship between the corrector ring mounting objective lens and the corrector ring driving device, attached to a revolver, in FIG. 2A.

FIGS. 2A and 2B show the corrector ring driving device of the microscopic objective lens provided with the corrector ring according to the first embodiment of the present invention.

In FIGS. 2A and 2B, reference numeral 3 represents a revolver; 4, a corrector ring mounting objective lens; 5, an imaging section forming light from a sample (specimen) passing through the objective lens as an image; 6, an illumination section illuminating a sample (specimen) with illumination light through the objective lens; 7, a stage on which a sample (specimen) vessel is placed; 8, a sample (specimen) vessel; and 9, a sample (specimen). The imaging section 5 includes an image sensor 5a, an imaging lens 5b, and a path splitting member 5c. The illumination section 6 includes a light source 6a, an illumination lens 6b, and the path splitting member 5c. The sample (specimen) vessel 8 is provided with a plurality of wells 8a. Also, since this arrangement is only shown as one example of a microscope to which the corrector ring driving device of the first embodiment is applicable, any arrangement may be made.

The corrector ring driving device of the first embodiment has a rotation driving mechanism 1 and a connection means 2. On the periphery of a corrector ring 4a of the corrector ring mounting objective lens 4 driven through the corrector ring driving device of the first embodiment, a spur gear 4b is mounted. The rotation driving mechanism 1 has a motor 1a and a turning effort transmitting section 1b.

The motor 1a is constructed, for example, as a stepping motor, and is incorporated in a housing 1c of the rotation driving mechanism 1. The rotary shaft of the motor 1a projects into the exterior of the housing 1c. A mounting and dismounting section 1d in which the objective lens can be mounted and dismounted with respect to any of objective mounting and dismounting sections 3a provided in the revolver 3 of the microscope is configured at the end of the housing 1c opposite to the side into which the rotary shaft of the motor 1a projects. In FIG. 2B, the rotation driving mechanism 1 is attached to the objective mounting and dismounting section 3a next to the objective mounting and dismounting section 3a to which the corrector ring mounting objective lens 4 is mounted.

The turning effort transmitting section 1b includes a spur gear 1b1, a spur gear 1b2, a bevel gear 1b3, a shaft member 1b4, and a support 1b5. The spur gear 1b1 is provided at the top of the rotary shaft of the motor 1a. The spur gear 1b2 and the bevel gear 1b3 are coaxially provided on the shaft member 1b4. The shaft member 1b4 is rotatably supported by the support 1b5. The support 1b5 is fixed to a preset part of the housing 1c of the rotation driving mechanism 1.

The spur gear 1b2 is constructed to engage with the spur gear 1b1. The bevel gear 1b3 has a gear portion 1b31 engaging with the spur gear 4b provided on the periphery of the corrector ring 4a of the corrector ring mounting objective lens 4 along the direction of rotation and a disengagement portion 1b32 with a diameter of a length required to disengage the spur gear 4b.

The connection means 2 is constructed to connect the turning effort transmitting section 1b with the corrector ring 4a of the corrector ring mounting objective lens 4 introduced into the observation optical path in association with the switching operation performed by the revolver 3 and to disconnect the turning effort transmitting section 1b from the corrector ring 4a of the corrector ring mounting objective lens 4 removed from the observation optical path.

More specifically, the connection means 2 is provided with a function of controlling the amount of rotation of the motor 1a so that when the corrector ring mounting objective lens 4 is introduced into the observation optical path, the gear portion 1b31 of the bevel gear 1b3 of the turning effort transmitting section 1b engages with the spur gear 4b mounted on the periphery of the corrector ring 4a of the corrector ring mounting objective lens 4, while when the corrector ring mounting objective lens 4 is removed from the observation optical path, the spur gear 4b mounted on the periphery of the corrector ring 4a of the corrector ring mounting objective lens 4 is disengaged through the disengagement portion 1b32 of the bevel gear 1b3 of the turning effort transmitting section 1b.

In order to perform the function described above, the connection means 2 has an objective sensing means 2a, a rotation-amount arithmetic means 2b, and a drive control means. The objective sensing means 2a is constructed, for example, with a switch and a sensor, and has a function of sensing the objective lens introduced into the observation optical path of the microscope so that the introduction and removal of the corrector ring mounting objective lens 4 into and from the observation optical path are sensed.

The rotation-amount arithmetic means 2b is provided with a function of calculating the optimum amount of turn relative to the corrector ring 4a of the corrector ring mounting objective lens 4 introduced into the observation optical path of the microscope in accordance with a sense signal from the objective sensing means 2a. More specifically, in each of cases where the corrector ring mounting objective lens 4 is introduced into the observation optical path and where it is removed therefrom, the optimum amount of turn is calculated relative to the corrector ring 4a of the corrector ring mounting objective lens 4 and in addition, the amount and direction of rotation of the motor 1a required for this are also calculated. The drive control means 2c is constructed so that the rotation driving mechanism 1 is driven and controlled by the amount and direction of rotation of the motor 1a calculated through the rotation-amount arithmetic means 2b.

In the corrector ring driving device of the first embodiment, the connection means 2 further detects the thickness of the sample (specimen) vessel or a cover member. It has a thickness detecting means 2d constructed, for example, with a sensor, so that the rotation-amount arithmetic means 2b calculates the optimum amount of turn relative to the corrector ring 4a of the corrector ring mounting objective lens 4 for correcting aberration caused by the corrector ring mounting objective lens 4 introduced into the observation optical path, with a thickness obtained through the thickness detecting means 2d as a parameter.

More specifically, the detection means 2d is constructed with at least a light source (not shown), a relay optical system (not shown) condensing light from the light source through the corrector ring mounting objective lens 4, and at least a photodetector (not shown) detecting reflected light from a sample (specimen) surface passing through the corrector ring mounting objective lens 4. The microscope of this embodiment is constructed to include a sequence that the corrector ring mounting objective lens 4 is driven along the optical axis by an alignment section of the microscope electrically driven, both surfaces of a sample (specimen) vessel or a cover member are detected by the detection means 2d, and the thickness of the sample (specimen) vessel or the cover member is measured.

In the calculation, by the rotation-amount arithmetic means 2b, of the optimum amount of turn relative to the corrector ring 4a of the corrector ring mounting objective lens 4 for correcting aberration caused by the corrector ring mounting objective lens 4 introduced into the observation optical path, index information of the objective lens introduced into the observation optical path is used as a parameter. When the corrector ring mounting objective lens 4 is mounted to the revolver 3, this index information is detected through an index information sensing means 2e and is transmitted to the rotation-amount arithmetic means 2b. The index information sensing means 2e includes, for example, a data section previously recording the refractive index varying with the kind of the objective lens mounted to the objective mounting and dismounting section 3a of the revolver 3 and an objective distinction section provided with a switch or a sensor, distinguishing the kind of the objective lens mounted to the objective mounting and dismounting section 3a of the revolver 3. Also, the record of the index information in the data section of the index information sensing means 2e may be manually input through a data input means (not shown) in another way.

In the corrector ring driving device of the first embodiment constructed as mentioned above, the drive of the corrector ring 4a of the corrector ring mounting objective lens 4 is carried out as described below.

A viewer first mounts the mounting and dismounting section 1d of the rotation driving mechanism 1 to the objective mounting and dismounting section 3a of the revolver 3. In this case, the corrector ring mounting objective lens 4 is not mounted to the next objective mounting and dismounting section 3a. Then, through the objective sensing means 2a, the rotation-amount arithmetic means 2b, and the drive control means 2c, the connection means 2 drives the motor 1a of the rotation driving mechanism 1 by a preset amount so that when the corrector ring 4a of the corrector ring mounting objective lens 4 is mounted to the next objective mounting and dismounting section 3a, the spur gear 4b does not interfere with the bevel gear 1b3. By transmitting the turning effort of the motor 1a to the spur gear 1b1, the spur gear 1b2, and the bevel gear 1b3 of the turning effort transmitting section 1b, the disengagement portion 1b32 of the bevel gear 1b3 is located on the spur-gear-4b side.

The viewer, after attaching the mounting and dismounting section 1d of the rotation driving mechanism 1 to the objective mounting and dismounting section 3a of the revolver 3, mounts the desired corrector ring mounting objective lens 4 to the objective mounting and dismounting section 3a next to the objective mounting and dismounting section 3a to which the rotation driving mechanism 1 is mounted. After that, the viewer rotates the revolver 3 to introduce the corrector ring mounting objective lens 4 into the observation optical path. At this time, by the connection means 2, the motor 1a of the rotation driving mechanism 1 is driven by a preset amount and the turning effort of the motor 1a is transmitted to the spur gear 1b1, the spur gear 1b2, and the bevel gear 1b3 through the objective sensing means 2a, the thickness detecting means 2d, the index information sensing means 2e, the rotation-amount arithmetic means 2b, and the drive control means 2c. The gear portion 1b31 of the bevel gear 1b3 is brought to a position where it engages with the spur gear 4b provided on the periphery of the corrector ring 4a of the corrector ring mounting objective lens 4, and is rotated by a preset amount. In this way, a preset amount of turning effort is transmitted to the corrector ring 4a of the objective lens 4 and the corrector ring 4a is driven. Whereby, in an observation image formed by the corrector ring mounting objective lens 4 introduced into the observation optical path, aberration is automatically corrected in the optimum state according to variation of the thickness of the sample (specimen) vessel or the cover member.

In the exchange for another corrector ring mounting objective lens 4, the viewer rotates the revolver 3 so that the existing corrector ring mounting objective lens 4 is removed from the observation optical path. As a result, the connection means 2 drives the motor 1a of the rotation driving mechanism 1 by a preset amount so that the disengagement portion 1b32 of the bevel gear 1b3 of the turning effort transmitting section 1b is located on the spur-gear-4b side through the objective sensing means 2a, the rotation-amount arithmetic means 2b, and the drive control means 2c. Whereby, the viewer can remove the existing corrector ring mounting objective lens 4 from the objective mounting and dismounting section 3a of the revolver 3 to mount the desired corrector ring mounting objective lens 4 to the objective mounting and dismounting section 3a of the revolver 3. After the viewer mounts the desired corrector ring mounting objective lens 4 to the objective mounting and dismounting section 3a of the revolver 3 and rotates the revolver 3 to introduce the corrector ring mounting objective lens 4 into the observation optical path, the connection means 2 likewise drives the motor 1a of the rotation driving mechanism 1 by a preset amount and the corrector ring 4a of the corrector ring mounting objective lens 4 through the objective sensing means 2a, the thickness detecting means 2d, the index information sensing means 2e, the rotation-amount arithmetic means 2b, and the drive control means 2c.

As mentioned above, according to the corrector ring driving device of the first embodiment, in contrast with the conventional corrector ring driving device, the corrector ring can be automatically driven without reconnecting the belt to the pulley. Moreover, even in a state where the revolver is mounted with the corrector ring mounting objective lens, the exchange of the corrector ring mounting objective lens and the introduction of the corrector ring mounting objective lens into the observation optical path can be done with great ease, and the operation load of the viewer is extremely lessened. By using such a corrector ring driving device in the microscope with the revolver, the microscope with the revolver that is capable of automatically adjusting the corrector ring of the objective lens to the optimum position in accordance with variation of the thickness of the sample (specimen) vessel or the cover member is obtained.

Also, when the corrector ring driving device of the first embodiment is provided to the objective mounting and dismounting section 3a so that it makes a pair with the corrector ring mounting objective lens 4 mounted to the revolver 3, the corrector rings 4a equal in number to the corrector ring mounting objective lenses 4 mounted to the revolver 3 can be driven only by rotating the revolver 3. When the revolver 3 is of a five-hole type as shown in FIG. 2B, two sets of combinations, each of the corrector ring mounting objective lens 4 with the corrector ring driving device, can be obtained. If the revolver is of a six-hole type, three sets of combinations, each of the corrector ring mounting objective lens with the corrector ring driving device, can be used.

Second Embodiment

Figure 3A:
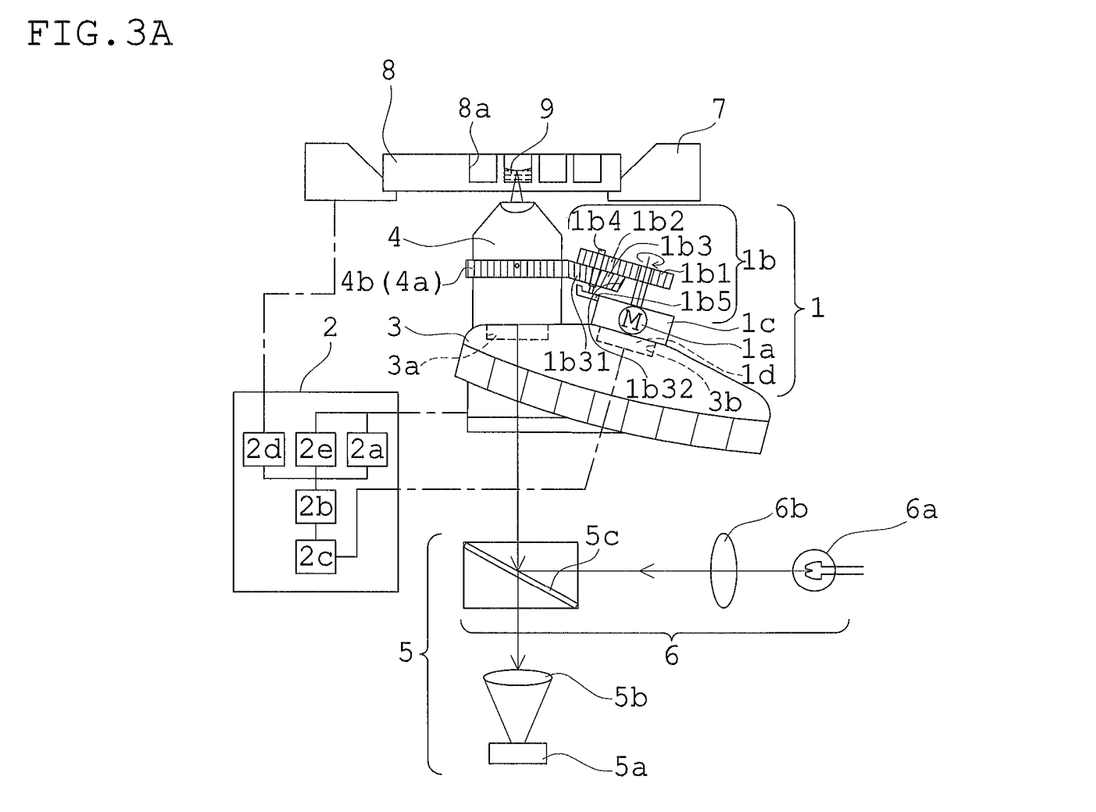
FIG. 3A is a view showing schematically the essential parts, viewed from the side, of a corrector ring driving device of a microscopic objective lens provided with a corrector ring according to a second embodiment of the present invention.
Figure 3B:
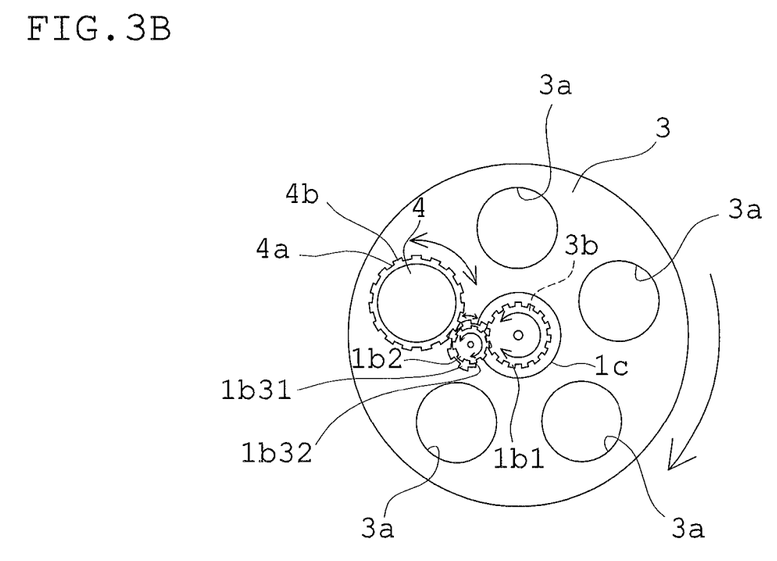
FIG. 3B is a plan view showing the positional relationship between the corrector ring mounting objective lens and the corrector ring driving device, attached to a revolver, in FIG. 3A.

FIGS. 3A and 3B show the corrector ring driving device of the microscopic objective lens provided with the corrector ring according to the second embodiment of the present invention.

In the corrector ring driving device of the second embodiment, as shown in FIG. 3B, the rotation driving mechanism 1 is secured to a shaft 3b fixed to the microscope body (not shown) that is the center of rotation of the revolver 3 of the microscope. Other features are almost the same as in the corrector ring driving device of the first embodiment.

In the corrector ring driving device of the second embodiment constructed as mentioned above, the drive of the corrector ring 4a of the corrector ring mounting objective lens 4 is carried out as described below.

By the connection means 2, first, through the objective sensing means 2a, the rotation-amount arithmetic means 2b, and the drive control means 2c, the motor 1a of the rotation driving mechanism 1 is driven by a preset amount and the turning effort of the motor 1a is transmitted to the spur gear 1b1, the spur gear 1b2, and the bevel gear 1b3 of the turning effort transmitting section 1b so that when the corrector ring 4a of the corrector ring mounting objective lens 4 is introduced into the observation optical path, the spur gear 4b does not interfere with the bevel gear 1b3. Whereby, the disengagement portion 1b32 of the bevel gear 1b3 is located on the spur-gear-4b side. The viewer mounts the desired corrector ring mounting objective lens 4 to the desired objective mounting and dismounting section 3a in the revolver 3.

Subsequently, the viewer rotates the revolver 3 to introduce the desired corrector ring mounting objective lens 4 into the observation optical path. At this time, through the objective sensing means 2*a*, the thickness detecting means 2*d*, the index information sensing means 2*e*, the rotation-amount arithmetic means 2*b*, and the drive control means 2*c*, the connection means 2 drives the motor 1*a* of the rotation driving mechanism 1 by a preset amount to transmit the turning effort of the motor 1*a* to the spur gear 1*b*1, the spur gear 1*b*2, and the bevel gear 1*b*3. The gear portion 1*b*31 of the bevel gear 1*b*3 is brought to a position where it engages with the spur gear 4*b* provided on the periphery of the corrector ring 4*a* of the corrector ring mounting objective lens 4, and is rotated by a preset amount. In this way, a preset amount of turning effort is transmitted to the corrector ring 4*a* of the objective lens 4 and the corrector ring 4*a* is driven. Whereby, in an observation image formed by the corrector ring mounting objective lens 4 introduced into the observation optical path, aberration is automatically corrected in the optimum state according to variation of the thickness of the sample (specimen) vessel or the cover member.

In the exchange for another corrector ring mounting objective lens 4, the viewer rotates the revolver 3 so that the existing corrector ring mounting objective lens 4 is removed from the observation optical path. As a result, the connection means 2 drives the motor 1*a* of the rotation driving mechanism 1 by a preset amount so that the disengagement portion 1*b*32 of the bevel gear 1*b*3 of the turning effort transmitting section 1*b* is located on the spur-gear-4*b* side through the objective sensing means 2*a*, the rotation-amount arithmetic means 2*b*, and the drive control means 2*c*. Whereby, the viewer can introduce another corrector ring mounting objective lens 4 into the observation optical system. After that, the connection means 2 likewise drives the motor 1*a* of the rotation driving mechanism 1 by a preset amount and the corrector ring 4*a* of the corrector ring mounting objective lens 4 through the objective sensing means 2*a*, the thickness detecting means 2*d*, the index information sensing means 2*e*, the rotation-amount arithmetic means 2*b*, and the drive control means 2*c*.

According to the corrector ring driving device of the second embodiment, as mentioned above, when the corrector rings 4*a* of a plurality of corrector ring mounting objective lenses 4 mounted to the revolver 3 are driven, the single turning effort transmitting section 1*b* is needed and it is not necessary that the turning effort transmitting section 1*b* is provided to the objective mounting and dismounting section 3*a* so that it makes a pair with the corrector ring mounting objective lens 4 mounted to the revolver 3. Hence, the cost is kept down accordingly and the operation load of the viewer is further lessened. Other functions and effects are nearly the same as in the corrector ring driving device of the first embodiment.

Third Embodiment

Figure 4A:
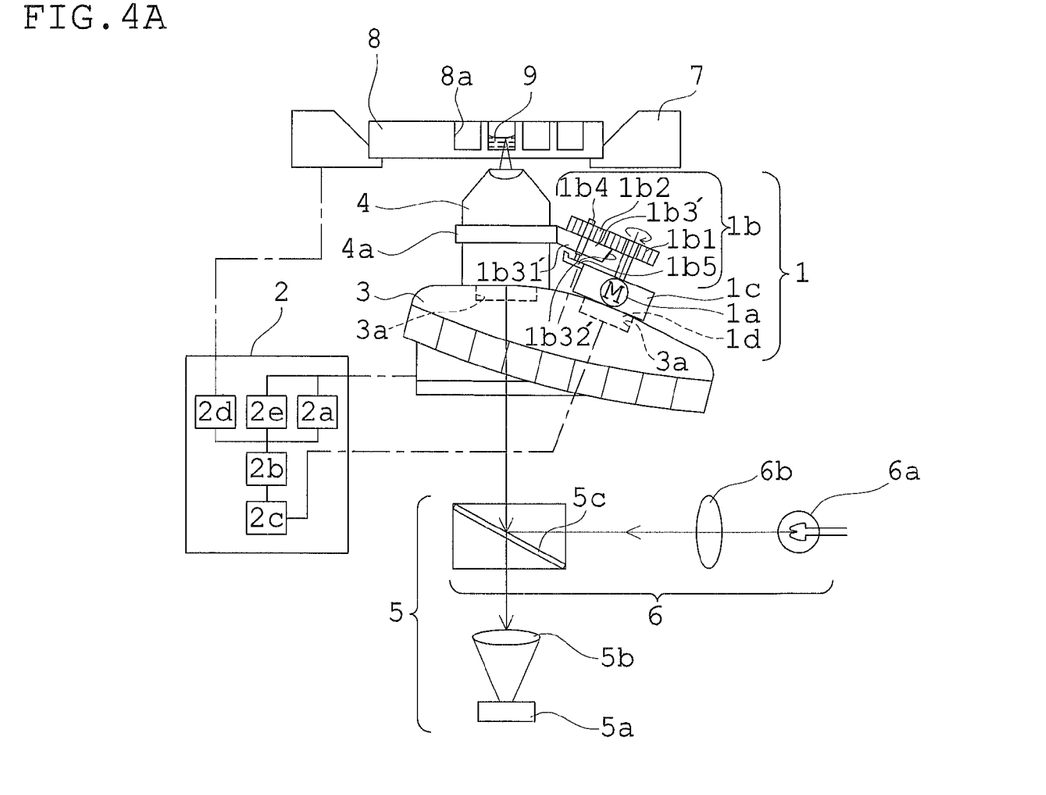
FIG. 4A is a view showing schematically the essential parts, viewed from the side, of a corrector ring driving device of a microscopic objective lens provided with a corrector ring according to a third embodiment of the present invention.
Figure 4B:
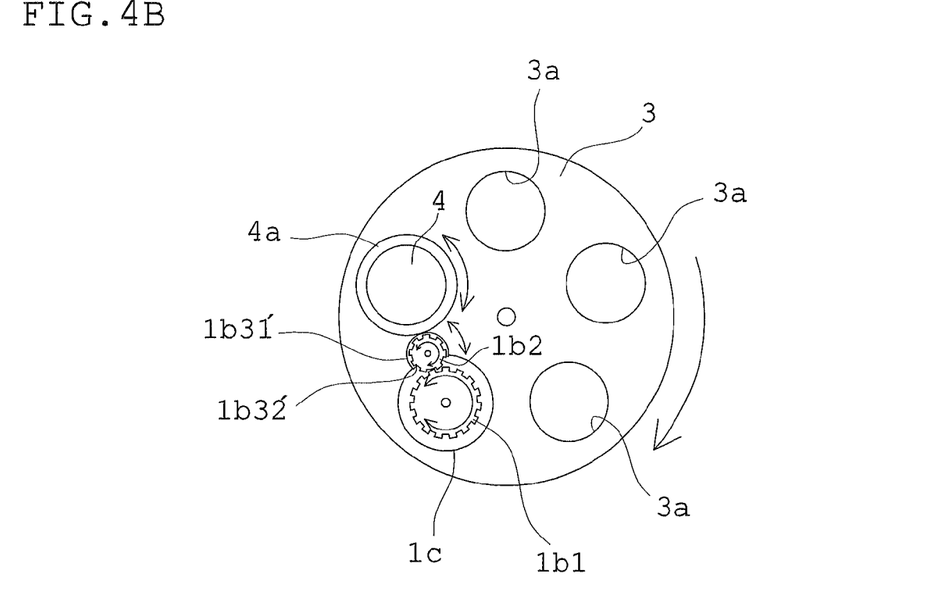
FIG. 4B is a plan view showing the positional relationship between the corrector ring mounting objective lens and the corrector ring driving device, attached to a revolver, in FIG. 4A.

FIGS. 4A and 4B show the corrector ring driving device of the microscopic objective lens provided with the corrector ring according to the third embodiment of the present invention.

In the corrector ring driving device of the third embodiment, the turning effort transmitting section 1*b* is designed to use a rotary roller 1*b*3' instead of the bevel gear 1*b*3 in the turning effort transmitting section 1*b* of the corrector ring driving device of the first embodiment shown in FIGS. 2A and 2B. The rotary roller 1*b*3' has a taper-shaped pressure exerting portion 1*b*31' pressed against the corrector ring 4*a* of the corrector ring mounting objective lens 4 along the direction of rotation and a pressure release portion 1*b*32' with a diameter of a length required to release the pressure applied to the corrector ring 4*a*.

The connection means 2 has a function of controlling the amount of rotation of the motor 1*a* so that when the corrector ring mounting objective lens 4 is introduced into the observation optical path, the pressure exerting portion 1*b*31' of the rotary roller 1*b*3' of the turning effort transmitting section 1*b* is pressed against the periphery of the corrector ring 4*a* of the corrector ring mounting objective lens 4, while when the corrector ring mounting objective lens 4 is removed from the observation optical path, the pressure applied to the periphery of the corrector ring 4*a* of the corrector ring mounting objective lens 4 is released through the pressure release portion 1*b*32' of the rotary roller 1*b*3' of the turning effort transmitting section 1*b*. Other features are nearly the same as in the corrector ring driving device of the first embodiment shown in FIGS. 2A and 2B.

Even in the corrector ring driving device of the third embodiment, the pressure exerting portion 1*b*31' of the rotary roller 1*b*3' of the turning effort transmitting section 1*b* is pressed against the periphery of the corrector ring 4*a* of the corrector ring mounting objective lens 4, and thereby the turning effort of the motor 1*a* can be transmitted to the corrector ring 4*a* of the objective lens 4, so that nearly the same function and effect as in the corrector ring driving device of the first embodiment are obtained.

Fourth Embodiment

Figure 5A:
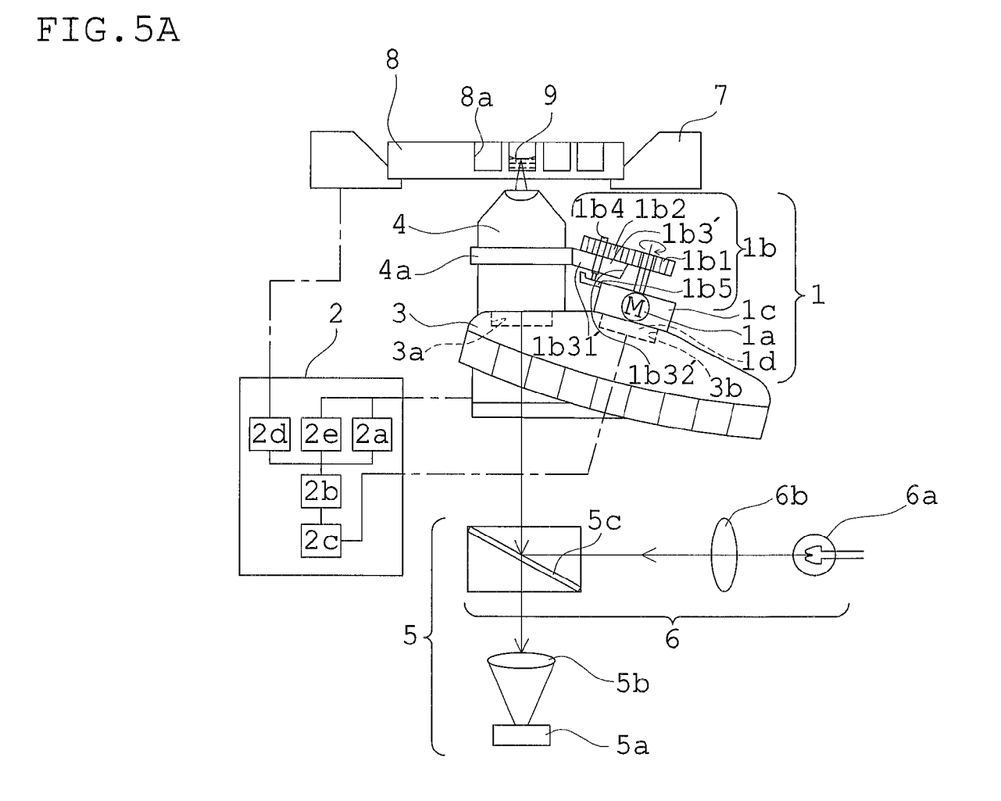
FIG. 5A is a view showing schematically the essential parts, viewed from the side, of a corrector ring driving device of a microscopic objective lens provided with a corrector ring according to a fourth embodiment of the present invention.
Figure 5B:
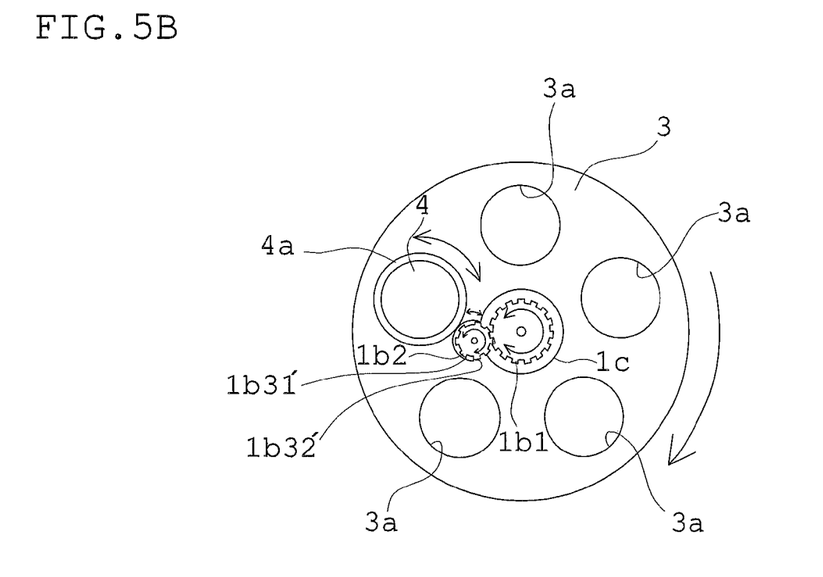
FIG. 5B is a plan view showing the positional relationship between the corrector ring mounting objective lens and the corrector ring driving device, attached to a revolver, in FIG. 5A.

FIGS. 5A and 5B show the corrector ring driving device of the microscopic objective lens provided with the corrector ring according to the fourth embodiment of the present invention.

In the corrector ring driving device of the fourth embodiment, the turning effort transmitting section 1*b* is designed to use the rotary roller 1*b*3' instead of the bevel gear 1*b*3 in the turning effort transmitting section 1*b* of the corrector ring driving device of the second embodiment shown in FIGS. 3A and 3B. The rotary roller 1*b*3' has the taper-shaped pressure exerting portion 1*b*31' pressed against the corrector ring 4*a* of the corrector ring mounting objective lens 4 along the direction of rotation and the pressure release portion 1*b*32' with a diameter of a length required to release the pressure applied to the corrector ring 4*a*.

The connection means 2 is constructed to control the amount of rotation of the motor 1*a* so that when the corrector ring mounting objective lens 4 is introduced into the observation optical path, the pressure exerting portion 1*b*31' of the rotary roller 1*b*3' of the turning effort transmitting section 1*b* is pressed against the periphery of the corrector ring 4*a* of the corrector ring mounting objective lens 4, while when the corrector ring mounting objective lens 4 is removed from the observation optical path, the pressure applied to the periphery of the corrector ring 4*a* of the corrector ring mounting objective lens 4 is released through the pressure release portion 1*b*32' of the rotary roller 1*b*3' of the turning effort transmitting section 1*b*. Other features are nearly the same as in the corrector ring driving device of the second embodiment shown in FIGS. 3A and 3B.

Even in the corrector ring driving device of the fourth embodiment, the pressure exerting portion 1*b*31' of the rotary roller 1*b*3' of the turning effort transmitting section 1*b* is pressed against the periphery of the corrector ring 4*a* of the corrector ring mounting objective lens 4, and thereby the turning effort of the motor 1*a* can be transmitted to the corrector ring 4*a* of the objective lens 4, so that nearly the same function and effect as in the corrector ring driving device of the second embodiment are obtained.

Fifth Embodiment

Figure 6:
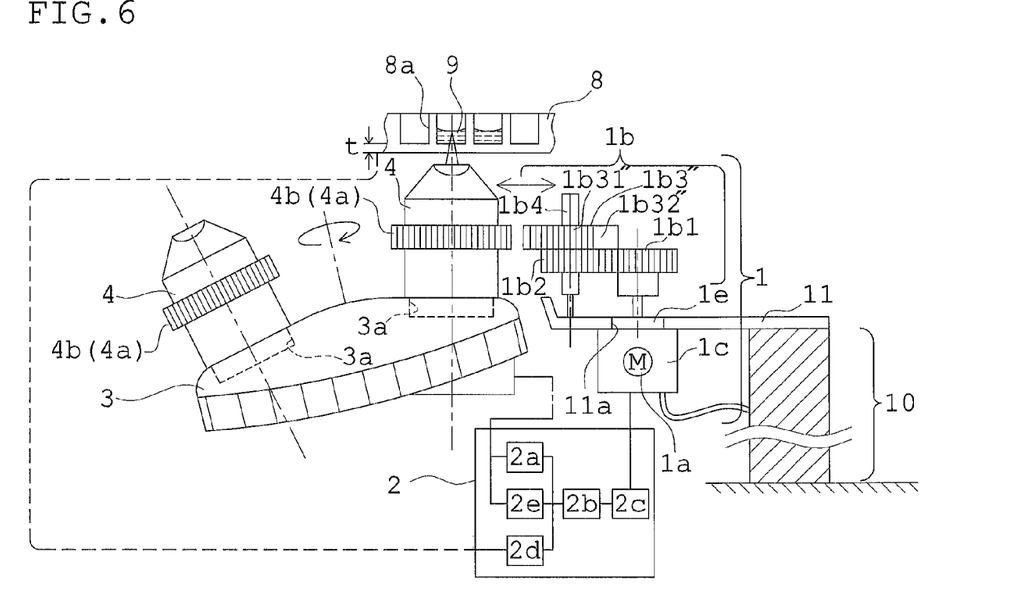
FIG. 6 is an explanatory view showing schematically the essential parts, viewed from the side, of a corrector ring driving device of a microscopic objective lens provided with a corrector ring according to a fifth embodiment of the present invention.

FIG. 6 shows the corrector ring driving device of the microscopic objective lens provided with the corrector ring according to the fifth embodiment of the present invention.

Also, on the periphery of the corrector ring 4a of the corrector ring mounting objective lens 4 driven through the corrector ring driving device of the fifth embodiment, the spur gear 4b is mounted. In the corrector ring driving device of the fifth embodiment, the rotation driving mechanism 1 is supported by a support 11 independent of the revolver 3. The support 11 is constructed, for example, of an elastic member having an elastic function like a plate spring and is secured to a microscope body 10.

The motor 1a is fixed in a state where a convexity 1e provided at the end of a housing 1c from which the rotary shaft of the motor 1a protrudes is fitted into a hole 11a provided in the support 11. The turning effort transmitting section 1b includes the spur gear 1b1, the spur gear 1b2, a spur gear 1b3", and the shaft member 1b4. The spur gear 1b1 is provided at the top of the rotary shaft of the motor 1a. The spur gear 1b2 and the spur gear 1b3" are coaxially provided to the shaft member 1b4. The shaft member 1b4 is rotatably supported by the support 11.

The spur gear 1b2 is constructed to engage with the spur gear 1b1. The spur gear 1b3" has a gear portion 1b31" engaging with the spur gear 4b provided on the periphery of the corrector ring 4a of the corrector ring mounting objective lens 4 along the direction of rotation and a disengagement portion 1b32" with a diameter of a length required to disengage the spur gear 4b.

The connection means 2 has a function of controlling the amount of rotation of the motor 1a so that when the corrector ring mounting objective lens 4 is introduced into the observation optical path, the gear portion 1b31" of the spur gear 1b3" of the turning effort transmitting section 1b engages with the spur gear 4b mounted on the periphery of the corrector ring 4a of the corrector ring mounting objective lens 4, while when the corrector ring mounting objective lens 4 is removed from the observation optical path, the spur gear 4b mounted on the periphery of the corrector ring 4a of the corrector ring mounting objective lens 4 is disengaged through the disengagement portion 1b32" of the spur gear 1b3" of the turning effort transmitting section 1b.

Additionally, the corrector ring driving device of the fifth embodiment is such that the gear portion 1b31" of the spur gear 1b3" of the turning effort transmitting section 1b can be pressed so that the turning effort of the rotation driving mechanism is transmitted to the spur gear 4b mounted to the periphery of the corrector ring 4a of the corrector ring mounting objective lens 4 introduced into the observation optical path through the revolver 3 by the elastic deformation of the support 11 to drive the corrector ring 4a, and such that the pressure between the corrector ring 4a of the corrector ring mounting objective lens 4 and the gear portion 1b31" of the spur gear 1b3" can also be released to remove the objective lens from the observation optical path. Other features are almost the same as in the corrector ring driving device of the first embodiment shown in FIGS. 2A and 2B.

In the corrector ring driving device of the fifth embodiment constructed as mentioned above, the drive of the corrector ring 4a of the corrector ring mounting objective lens 4 is carried out as described below. Through the objective sensing means 2a, the rotation-amount arithmetic means 2b, and the drive control means 2c, the connection means 2 first drives the motor 1a of the rotation driving mechanism 1 by a preset amount so that when the corrector ring mounting objective lens 4 is introduced into the observation optical path, the spur gear 4b does not interfere with the spur gear 1b3", to transmit the turning effort of the motor 1a to the spur gear 1b1, the spur gear 1b2, and the spur gear 1b3" of the turning effort transmitting section 1b. Whereby, the disengagement portion 1b32" of the spur gear 1b3" is located on the spur-gear-4b side. The viewer mounts the desired corrector ring mounting objective lens 4 to the desired objective mounting and dismounting section 3a in the revolver 3.

Subsequently, the viewer rotates the revolver 3 to introduce the desired corrector ring mounting objective lens 4 into the observation optical path. At this time, through the objective sensing means 2a, the thickness detecting means 2d, the index information sensing means 2e, the rotation-amount arithmetic means 2b, and the drive control means 2c, the connection means 2 drives the motor 1a of the rotation driving mechanism 1 by a preset amount to transmit the turning effort of the motor 1a to the spur gear 1b1, the spur gear 1b2, and the spur gear 1b3". The gear portion 1b31" of the spur gear 1b3" is brought to a position where it engages with the spur gear 4b provided on the periphery of the corrector ring 4a of the corrector ring mounting objective lens 4 and is rotated by a preset amount. In this way, a preset amount of turning effort is transmitted to the corrector ring 4a of the objective lens 4 and the corrector ring 4a is driven. Whereby, in an observation image formed by the corrector ring mounting objective lens 4 introduced into the observation optical path, aberration is automatically corrected in the optimum state according to variation of the thickness of the sample (specimen) vessel or the cover member. At this time, the gear portion 1b31" of the spur gear 1b3" is pressed against the spur gear 4b provided on the periphery of the corrector ring 4a of the corrector ring mounting objective lens 4 by the elastic deformation of the support 11, and thus a stable engaged state can be maintained although they are supported by different members.

In the exchange for another corrector ring mounting objective lens 4, the viewer rotates the revolver 3 so that the existing corrector ring mounting objective lens 4 is removed from the observation optical path. As a result, the connection means 2 drives the motor 1a of the rotation driving mechanism 1 by a preset amount so that the disengagement portion 1b32" of the spur gear 1b3" of the turning effort transmitting section 1b is located on the spur-gear-4b side through the objective sensing means 2a, the rotation-amount arithmetic means 2b, and the drive control means 2c. In this case, the support 11 is elastically deformed and thereby the pressure between the corrector ring 4a of the corrector ring mounting objective lens 4 and the gear portion 1b31" of the spur gear 1b3" is released. Whereby, the viewer can introduce another corrector ring mounting objective lens 4 into the observation optical path. After that, the connection means 2 likewise drives the motor 1a of the rotation driving mechanism 1 by a preset amount and the corrector ring 4a of the corrector ring mounting objective lens 4 through the objective sensing means 2a, the thickness detecting means 2d, the index information sensing means 2e, the rotation-amount arithmetic means 2b, and the drive control means 2c.

According to the corrector ring driving device of the fifth embodiment, as mentioned above, like the corrector ring driving device of the second embodiment, when the corrector rings 4a of a plurality of corrector ring mounting objective lenses 4 mounted to the revolver 3 are driven, the single turning effort transmitting section 1b is needed and it is not necessary that the turning effort transmitting section 1b is provided to the objective mounting and dismounting section 3a so that it makes a pair with the corrector ring mounting objective lens 4 mounted to the revolver 3. Hence, the cost is kept down accordingly and the operation load of the viewer is more lessened. Further, since the corrector ring driving device, unlike that of the second embodiment, is designed so that the rotation driving mechanism 1 is supported by the support 11 secured to the microscope body 10 independent of the revolver 3, a conventional microscope revolver can be used as it is. Still further, the support 11 is constructed of an elastic member and hence stable connection and disconnection states can be kept although the gear portion 1b31" of the spur gear 1b3" and the spur gear 4b provided on the periphery of the corrector ring 4a of the corrector ring mounting objective lens 4 are supported by different members. Other functions and effects are nearly the same as in the corrector ring driving device of the first embodiment.

Sixth Embodiment

Figure 7:
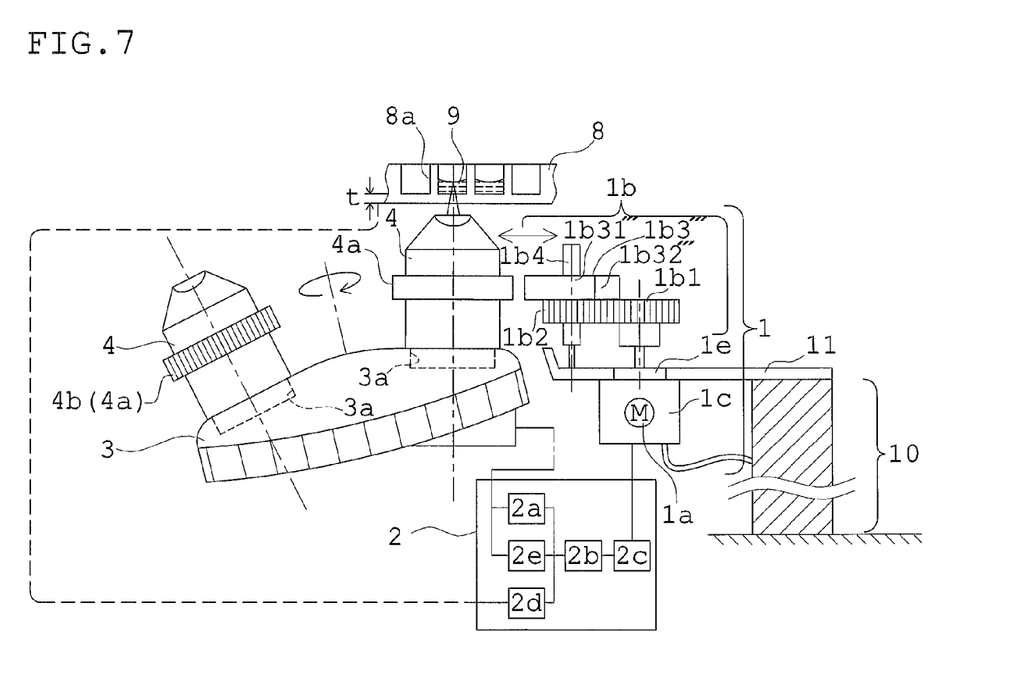
FIG. 7 is an explanatory view showing schematically the essential parts, viewed from the side, of a corrector ring driving device of a microscopic objective lens provided with a corrector ring according to a sixth embodiment of the present invention.

FIG. 7 shows the corrector ring driving device of the microscopic objective lens provided with the corrector ring according to the sixth embodiment of the present invention.

In the corrector ring driving device of the sixth embodiment, the turning effort transmitting section 1b is designed to use a cylindrical rotary roller 1b3''' instead of the spur gear 1b3" in the turning effort transmitting section 1b of the corrector ring driving device of the fifth embodiment shown in FIG. 6. The rotary roller 1b3''' has a pressure exerting portion 1b31''' pressed against the corrector ring 4a of the corrector ring mounting objective lens 4 along the direction of rotation and a pressure release portion 1b32''' with a diameter of a length required to release the pressure applied to the corrector ring 4a.

The connection means 2 has a function of controlling the amount of rotation of the motor 1a so that when the corrector ring mounting objective lens 4 is introduced into the observation optical path, the pressure exerting portion 1b31''' of the rotary roller 1b3''' of the turning effort transmitting section 1b is pressed against the periphery of the corrector ring 4a of the corrector ring mounting objective lens 4, while when the corrector ring mounting objective lens 4 is removed from the observation optical path, the pressure applied to the periphery of the corrector ring 4a of the corrector ring mounting objective lens 4 is released through the pressure release portion 1b32''' of the rotary roller 1b3''' of the turning effort transmitting section 1b. Other features are nearly the same as in the corrector ring driving device of the fifth embodiment shown in FIG. 6.

Even in the corrector ring driving device of the sixth embodiment, the pressure exerting portion 1b31''' of the rotary roller 1b3''' of the turning effort transmitting section 1b is pressed against the periphery of the corrector ring 4a of the corrector ring mounting objective lens 4, and thereby the turning effort of the motor 1a can be transmitted to the corrector ring 4a of the objective lens 4, so that nearly the same function and effect as in the corrector ring driving device constructed to provide the turning effort transmitting section 1b with the spur gear 1b3", shown in FIG. 6, are obtained.

Seventh Embodiment

Figure 8:
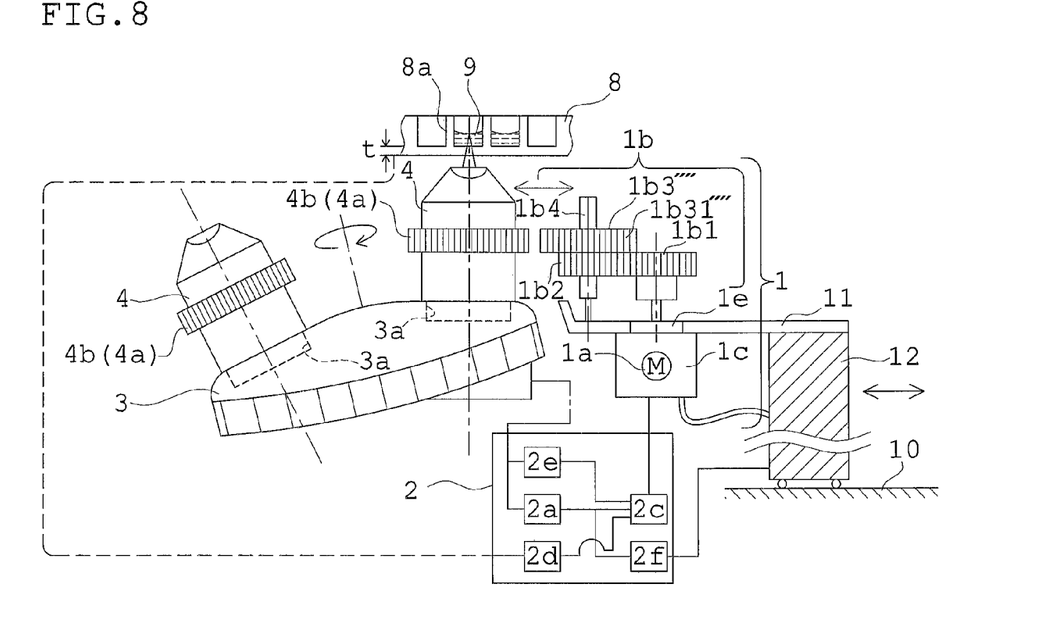
FIG. 8 is an explanatory view showing schematically the essential parts, viewed from the side, of a corrector ring driving device of a microscopic objective lens provided with a corrector ring according to a seventh embodiment of the present invention.

FIG. 8 shows the corrector ring driving device of the microscopic objective lens provided with the corrector ring according to the seventh embodiment of the present invention. Also, on the periphery of the corrector ring 4a of the corrector ring mounting objective lens 4 driven through the corrector ring driving device of the seventh embodiment, the spur gear 4b is mounted. In the corrector ring driving device of the seventh embodiment, the rotation driving mechanism 1 is supported by the support 11 independent of the revolver 3. The support 11 is constructed of a member that the elastic deformation is hard to occur, and is fixed to a moving member 12. The moving member 12 is constructed to be movable with respect to the microscope body 10.

The turning effort transmitting section 1b includes the spur gear 1b1, the spur gear 1b2, a spur gear 1b3"", and the shaft member 1b4. The spur gear 1b1 is provided at the top of the rotary shaft of the motor 1a. The spur gear 1b2 and the spur gear 1b3"" are coaxially provided to the shaft member 1b4. The shaft member 1b4 is rotatably supported by the support 11. The spur gear 1b2 is constructed to engage with the spur gear 1b1. The spur gear 1b3"" has a gear portion 1b31"" engaging with the spur gear 4b provide on the periphery of the corrector ring 4a of the corrector ring mounting objective lens 4 throughout the whole of the direction of rotation.

The connection means 2 is provided with a travel control means 2f in addition to the objective sensing means 2a, the rotation-amount arithmetic means 2b, the drive control means 2c, the thickness detecting means 2d, and the index information sensing means 2e. The travel control means 2f is constructed so that the support 11 fixed to the moving member 12 is moved to connection and disconnection positions of the turning effort transmitting section 1b relative to the corrector ring 4a of the corrector ring mounting objective lens 4 introduced into the observation optical path in association with the switching operation performed by the revolver 3.

More specifically, the travel control means 2f has a function of controlling the amount and direction of travel of the moving member 12 so that when the corrector ring mounting objective lens 4 is introduced into the observation optical path in accordance with a sense signal from the objective sensing means 2a, the gear portion 1b31"" of the spur gear 1b3"" of the turning effort transmitting section 1b engages with the spur gear 4b mounted on the periphery of the corrector ring 4a of the corrector ring mounting objective lens 4, while when the corrector ring mounting objective lens 4 is removed from the observation optical path, the gear portion 1b31"" of the spur gear 1b3"" of the turning effort transmitting section 1b is disengaged from the spur gear 4b mounted on the periphery of the corrector ring 4a of the corrector ring mounting objective lens 4.

In the corrector ring driving device of the seventh embodiment, the rotation-amount arithmetic means 2b has a function of calculating the optimum amount of turn relative to the corrector ring 4a of the corrector ring mounting objective lens 4 introduced into the observation optical path of the microscope in accordance with the sense signal from the objective sensing means 2a. More specifically, in the case where the corrector ring mounting objective lens 4 is introduced into the observation optical path, the optimum amount of turn is calculated relative to the corrector ring 4a of the corrector ring mounting objective lens 4 and in addition, the amount and direction of rotation of the motor 1a required for this are also calculated. Other features are almost the same as the corrector ring driving device of the fifth embodiment shown in FIG. 6.

In the corrector ring driving device of the seventh embodiment constructed as mentioned above, the drive of the corrector ring 4a of the corrector ring mounting objective lens 4 is carried out as described below. First, through the objective sensing means 2a and the travel control means 2f, the connection means 2 moves the moving member 12, away from the revolver 3, by a preset amount so that when the corrector ring mounting objective lens 4 is introduced into the observation optical path, the spur gear 4b does not interfere with the spur gear 1b3"". The viewer mounts the desired corrector ring mounting objective lens 4 to the desired objective mounting and dismounting section 3*a* in the revolver 3.

Subsequently, the viewer rotates the revolver 3 to introduce the desired corrector ring mounting objective lens 4 into the observation optical path. At this time, through the objective sensing means 2*a* and the travel control means 2*f*, the connection means 2 moves the moving member 12 by a preset amount so that the gear portion 1*b*31"" of the spur gear 1*b*3"" of the turning effort transmitting section 1*b* engages with the corrector ring 4*a* of the corrector ring mounting objective lens 4 introduced into the observation optical path. Next, through the objective sensing means 2*a*, the thickness detecting means 2*d*, the index information sensing means 2*e*, the rotation-amount arithmetic means 2*b*, and the drive control means 2*c*, the connection means 2 drives the motor 1*a* of the rotation driving mechanism 1 by a preset amount so that the turning effort of the motor 1*a* is transmitted to the spur gear 1*b*1, the spur gear 1*b*2, and the spur gear 1*b*3"", and the gear portion 1*b*31"" of the spur gear 1*b*3"" is rotated by a preset amount while engaging with the spur gear 4*b* provided on the periphery of the corrector ring 4*a* of the corrector ring mounting objective lens 4. Whereby, in the observation image formed by the corrector ring mounting objective lens 4 introduced into the observation optical path, aberration is automatically corrected in the optimum state according to variation of the thickness of the sample (specimen) vessel or the cover member.

In the exchange for another corrector ring mounting objective lens 4, the viewer rotates the revolver 3 so that the existing corrector ring mounting objective lens 4 is removed from the observation optical path. As a result, through the objective sensing means 2*a* and the travel control means 2*f*, the connection means 2 moves the moving member 12, away from the revolver 3, by a preset amount so that when the spur gear 1*b*3"" is disengaged from the corrector ring 4*a* of the corrector ring mounting objective lens 4 and the next corrector ring mounting objective lens 4 is introduced into the observation optical path, the spur gear 4*b* does not interfere with the spur gear 1*b*3"". Whereby, the viewer can introduce another corrector ring mounting objective lens 4 into the observation optical path.

After that, likewise, the moving member 12 is moved by a preset amount through the objective sensing means 2*a* and the travel control means 2*f* so that the gear portion 1*b*31"" of the spur gear 1*b*3"" of the turning effort transmitting section 1*b* engages with the corrector ring 4*a* of the corrector ring mounting objective lens 4 introduced into the observation optical path. Next, the connection means 2 drives the motor 1*a* of the rotation driving mechanism 1 by a preset amount and turns the corrector ring 4*a* of the corrector ring mounting objective lens 4 through the objective sensing means 2*a*, the thickness detecting means 2*d*, the index information sensing means 2*e*, the rotation-amount arithmetic means 2*b*, and the drive control means 2*c*.

According to the corrector ring driving device of the seventh embodiment, the support 11 is constructed to be movable through the moving member 12 and the connection means 2 is provided with the travel control means 2*f* making the support 11 movable through the moving member 12 to the connection and disconnection positions of the turning effort transmitting section 1*b* relative to the corrector ring 4*a* of the corrector ring mounting objective lens 4 introduced into the observation optical path in association with the switching operation performed by the revolver 3. Hence, when the corrector ring mounting objective lens 4 is mounted to, and dismounted from, the objective mounting and dismounting section 3*a*, the moving member 12 is moved so that the rotation driving mechanism 1 lies at some distance away from the revolver 3, and thereby a wide space for mounting and dismounting the objective lens 4 can be ensured.

Eighth Embodiment

Figure 9:
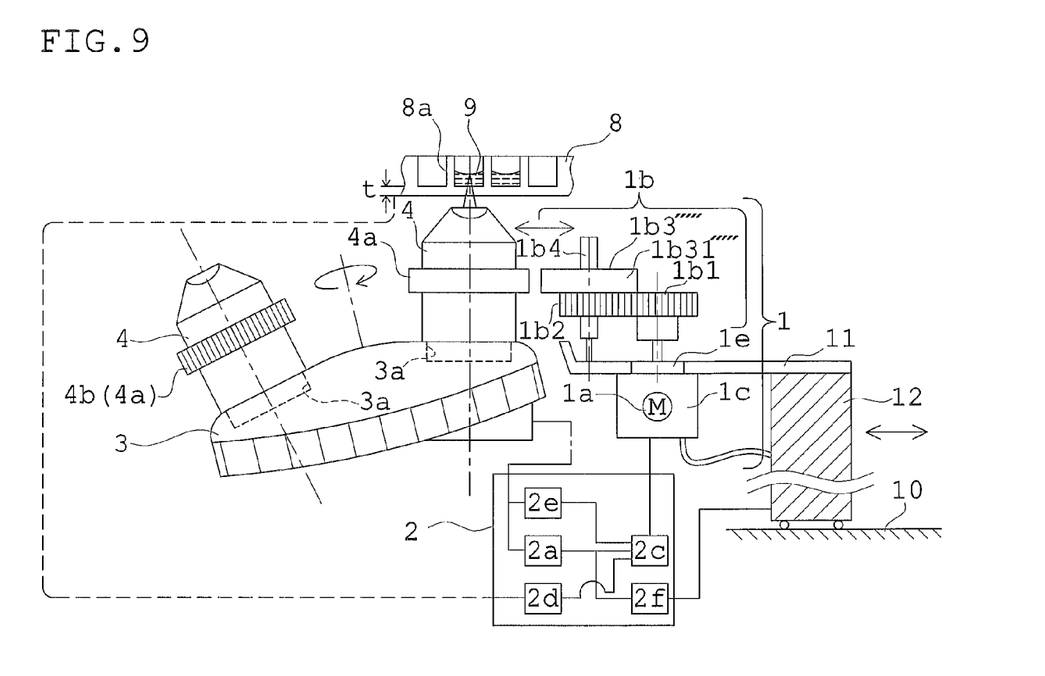
FIG. 9 is an explanatory view showing schematically the essential parts, viewed from the side, of a corrector ring driving device of a microscopic objective lens provided with a corrector ring according to an eighth embodiment of the present invention.

FIG. 9 shows the corrector ring driving device of the microscopic objective lens provided with the corrector ring according to the eighth embodiment of the present invention. In the corrector ring driving device of the eighth embodiment, the turning effort transmitting section 1*b* is designed to use a cylindrical rotary roller 1*b*3"" instead of the spur gear 1*b*3"" in the turning effort transmitting section 1*b* of the corrector ring driving device of the seventh embodiment shown in FIG. 8. The rotary roller 1*b*3"" has a pressure exerting portion 1*b*31"" pressed against the corrector ring 4*a* of the corrector ring mounting objective lens 4 throughout the whole of the direction of rotation.

The travel control means 2*f* of the connection means 2 has a function of controlling the amount and direction of travel of the moving member 12 so that when the corrector ring mounting objective lens 4 is introduced into the observation optical path in accordance with the sense signal from the objective sensing means 2*a*, the pressure exerting portion 1*b*31"" of the rotary roller 1*b*3"" of the turning effort transmitting section 1*b* is pressed against the corrector ring 4*a* of the corrector ring mounting objective lens 4, while when the corrector ring mounting objective lens 4 is removed from the observation optical path, the pressure of the pressure exerting portion 1*b*31"" of the rotary roller 1*b*3"" of the turning effort transmitting section 1*b* applied to the corrector ring 4*a* of the corrector ring mounting objective lens 4 is released.

Other features are almost the same as in the corrector ring driving device of the seventh embodiment shown in FIG. 8.

Even in the corrector ring driving device of the eighth embodiment, the pressure exerting portion 1*b*31"" of the rotary roller 1*b*3"" of the turning effort transmitting section 1*b* is pressed against the periphery of the corrector ring 4*a* of the corrector ring mounting objective lens 4, and thereby the turning effort of the motor 1*a* can be transmitted to the corrector ring 4*a* of the objective lens 4, so that nearly the same function and effect as in the corrector ring driving device constructed to provide the turning effort transmitting section 1*b* with the spur gear 1*b*3"", shown in FIG. 8, are obtained.

Also, although some embodiments according to the corrector ring driving device of the microscopic objective lens provided with the corrector ring in the present invention have been described, the corrector ring driving device of the microscopic objective lens provided with the corrector ring in the present invention is not limited to the structure of each embodiment mentioned above.

For example, the turning effort transmitting section 1*b* in the corrector ring driving device of the third or fourth embodiment shown in FIGS. 4A and 4B or 5A and 5B, instead of using the rotary roller 1*b*3', may be constructed to use the rotary roller 1*b*3"" having the pressure exerting portion 1*b*31"" pressed against the corrector ring 4*a* of the corrector ring amounting objective lens 4 throughout the whole of the direction of rotation, such as that shown in FIG. 9, so that the rotation-amount arithmetic means 2*b* has the function of calculating the optimum amount of turn relative to the corrector ring 4*a* of the corrector ring mounting objective lens 4 introduced into the observation optical path of the microscope in accordance with the sense signal from the objective sensing means 2*a*, and more specifically, in the case where the corrector ring mounting objective lens 4 is introduced into the observation optical path, the optimum amount of turn is calculated relative to the corrector ring 4a of the corrector ring mounting objective lens 4 and in addition, the amount and direction of rotation of the motor 1a required for this are also calculated.

Even when the turning effort transmitting section 1b is constructed as mentioned above, it becomes possible that the rotation driving mechanism 1 is constructed to connect the turning effort transmitting section 1b to the corrector ring 4a of the corrector ring mounting objective lens 4 introduced into the observation optical path, by the elastic deformation of the rotary roller 1b3"", in a switching operation performed by the revolver 3 and to release the connection of the turning effort transmitting section 1b with the corrector ring 4a of the corrector ring mounting objective lens 4 removed from the observation optical path. Hence, as in each embodiment mentioned above, the corrector ring driving device, in contrast with the conventional corrector ring driving device, is capable of automatically driving the corrector ring without reconnecting the belt to the pulley. Moreover, even in a state where the revolver is mounted with the corrector ring mounting objective lens, the exchange of the corrector ring mounting objective lens and the introduction of the corrector ring mounting objective lens into the observation optical path can be done with great ease, and the operation load of the viewer is extremely lessened. By using such a corrector ring driving device in the microscope with the revolver, the microscope with the revolver that is capable of automatically adjusting the corrector ring of the objective lens to the optimum position in accordance with variation of the thickness of the sample (specimen) vessel or the cover member is obtained.

Similarly, the turning effort transmitting section 1b in the corrector ring driving device of the fifth embodiment shown in FIG. 6, instead of using the rotary roller 1b31", may be constructed to use the spur gear 1b3"" having the gear portion 1b31"" engaging with the spur gear 4b provided on the periphery of the corrector ring 4a of the corrector ring amounting objective lens 4 throughout the whole of the direction of rotation, such as that shown in FIG. 8, so that the rotation-amount arithmetic means 2b has the function of calculating the optimum amount of turn relative to the corrector ring 4a of the corrector ring mounting objective lens 4 introduced into the observation optical path of the microscope in accordance with the sense signal from the objective sensing means 2a, and more specifically, in the case where the corrector ring mounting objective lens 4 is introduced into the observation optical path, the optimum amount of turn is calculated relative to the corrector ring 4a of the corrector ring mounting objective lens 4 and in addition, the amount and direction of rotation of the motor 1a required for this are also calculated.

Even when the turning effort transmitting section 1b is constructed as mentioned above, it becomes possible that the rotation driving mechanism 1 is constructed to connect the turning effort transmitting section 1b to the corrector ring 4a of the corrector ring mounting objective lens 4 introduced into the observation optical path, by the elastic deformation of the support 11, in a switching operation performed by the revolver 3 and to release the connection of the turning effort transmitting section 1b with the corrector ring 4a of the corrector ring mounting objective lens 4 removed from the observation optical path. Hence, as in each embodiment mentioned above, the corrector ring driving device, in contrast with the conventional corrector ring driving device, is capable of automatically driving the corrector ring without reconnecting the belt to the pulley. Moreover, even in a state where the revolver is mounted with the corrector ring mounting objective lens, the exchange of the corrector ring mounting objective lens and the introduction of the corrector ring mounting objective lens into the observation optical path can be done with great ease, and the operation load of the viewer is extremely lessened. By using such a corrector ring driving device in the microscope with the revolver, the microscope with the revolver that is capable of automatically adjusting the corrector ring of the objective lens to the optimum position in accordance with variation of the thickness of the sample (specimen) vessel or the cover member is obtained.

Further, similarly, the turning effort transmitting section 1b in the corrector ring driving device of the sixth embodiment shown in FIG. 7, instead of using the rotary roller 1b31'" may be constructed to use the rotary roller 1b3"'" having the pressure exerting portion 1b31"'" pressed against the corrector ring 4a of the corrector ring amounting objective lens 4 throughout the whole of the direction of rotation, such as that shown in FIG. 9, so that the rotation-amount arithmetic means 2b has the function of calculating the optimum amount of turn relative to the corrector ring 4a of the corrector ring mounting objective lens 4 introduced into the observation optical path of the microscope in accordance with the sense signal from the objective sensing means 2a, and more specifically, in the case where the corrector ring mounting objective lens 4 is introduced into the observation optical path, the optimum amount of turn is calculated relative to the corrector ring 4a of the corrector ring mounting objective lens 4 and in addition, the amount and direction of rotation of the motor 1a required for this are also calculated.

Even when the turning effort transmitting section 1b is constructed as mentioned above, it becomes possible that the rotation driving mechanism 1 is constructed to connect the turning effort transmitting section 1b to the corrector ring 4a of the corrector ring mounting objective lens 4 introduced into the observation optical path, by the elastic deformation of the support 11 and the rotary roller 1b3"'", in a switching operation performed by the revolver 3 and to release the connection of the turning effort transmitting section 1b with the corrector ring 4a of the corrector ring mounting objective lens 4 removed from the observation optical path. Hence, as in each embodiment mentioned above, the corrector ring driving device, in contrast with the conventional corrector ring driving device, is capable of automatically driving the corrector ring without reconnecting the belt to the pulley. Moreover, even in a state where the revolver is mounted with the corrector ring mounting objective lens, the exchange of the corrector ring mounting objective lens and the introduction of the corrector ring mounting objective lens into the observation optical path can be done with great ease, and the operation load of the viewer is extremely lessened. By using such a corrector ring driving device in the microscope with the revolver, the microscope with the revolver that is capable of automatically adjusting the corrector ring of the objective lens to the optimum position in accordance with variation of the thickness of the sample (specimen) vessel or the cover member is obtained.

Also, the arrangement of gears of the rotation driving mechanism 1 in each embodiment mentioned above is not limited to the arrangement shown in each figure. Any arrangement that the turning effort of the motor 1a is transmitted to the corrector ring 4a of the corrector ring mounting objective lens 4 attached to the objective mounting and dismounting section 3a to enable the corrector ring 4a to be driven is satisfactory.

As described above, the corrector ring driving device of the microscopic objective lens provided with the corrector ring of the present invention and the microscope having the corrector ring driving device of the objective lens provided with the corrector ring have additional features listed below.

(1) A microscope is mounted with at least a corrector ring mounting objective lens and has a corrector ring control device of the objective lens that is capable of automatically controlling the corrector ring of the corrector ring mounting objective lens at the optimum position in accordance with variation of the thickness of a sample (specimen) vessel or a cover member. This microscope having the corrector ring control device of the corrector ring mounting objective lens comprises a detection means detecting the thickness of the sample (specimen) vessel or the cover member; a rotation driving mechanism including at least a motor turning the corrector ring of the corrector ring mounting objective lens; an arithmetic means calculating the amount of turn of the corrector ring most suitable for the corrector ring mounting objective lens obtained from information of the thickness of the sample (specimen) vessel or the cover member; and a control means controlling the drive of the rotation driving mechanism so that the corrector ring of the corrector ring mounting objective lens is turned by the amount of turn calculated through the arithmetic means in accordance with a detection signal from the detection means.

(2) In the microscope having the corrector ring control device of the corrector ring mounting objective lens set forth in item (1), the arithmetic means is constructed so that information of an optical index of refraction is used together with the information of the thickness of the sample (specimen) vessel or the cover member as parameters to calculate the amount of turn of the corrector ring most suitable for the corrector ring mounting objective lens, and an input mean inputting the information of the optical index of refraction is further provided.

(3) The microscope having the corrector ring control device of the corrector ring mounting objective lens set forth in item (1) or (2) further comprises a plurality of mounting and dismounting sections allowing a plurality of kinds of objective lenses to be mounted and dismounted; an objective switching device for introducing a desired objective lens into an observation optical path by rotating on a shaft fixed to a microscope body; a connection mechanism connecting the rotation driving mechanism to the corrector ring of the corrector ring mounting objective lens in association with a switching operation performed by the objective switching device; an objective sensing means sensing the objective lens introduced into the observation optical path; and an arithmetic means calculating the amount of turn of the corrector ring most suitable for the corrector ring mounting objective lens introduced into the observation optical path in accordance with a sense signal from the objective sensing means.

(4) In the microscope having the corrector ring control device of the corrector ring mounting objective lens set forth in any one of items (1)-(3), the detection means is comprised of at least a light source, a relay optical system condensing light from the light source through the corrector ring mounting objective lens, and a photodetector detecting reflected light from a sample (specimen) surface through at least the corrector ring mounting objective lens, and a sequence that the corrector ring mounting objective lens is driven along the optical axis by an alignment section of the microscope electrically driven, both surfaces of the sample (specimen) vessel or a cover member are detected by the detection means, and the thickness of the sample (specimen) vessel or the cover member is measured is included.

The corrector ring driving device of the microscopic objective lens provided with the corrector ring of the present invention is useful in the fields of medicine and biology, requiring observations in which a plurality of kinds of corrector ring mounting objective lenses are used by switching the revolver.

What is claimed is:

1. A corrector ring driving device of a microscopic objective lens provided with a corrector ring which drives the corrector ring of a corrector ring mounting objective lens mounted to an objective switching device having a plurality of mounting and dismounting sections for mounting and dismounting a plurality of kinds of objective lenses, to each of which is mounted the corrector ring mounting objective lens, and allowing a desired objective lens to be introduced into an observation optical path by rotating on a shaft fixed to a microscope body, the corrector ring driving device comprising:

a rotation driving mechanism having a motor and a turning effort transmitting section which transmits a turning effort of the motor to the corrector ring of the corrector ring mounting objective lens mounted to the objective switching device to drive the corrector ring; and connection means for connecting the turning effort transmitting section to the corrector ring of the corrector ring mounting objective lens introduced into the observation optical path in association with a switching operation performed by the objective switching device and disconnecting the turning effort transmitting section from the corrector ring of the corrector ring mounting objective lens removed from the observation optical path.

2. A corrector ring driving device of a microscopic objective lens provided with a corrector ring according to claim 1, wherein an annular member having a spur gear portion is provided to be mountable with respect to the corrector ring of the corrector ring mounting objective lens and the turning effort transmitting section has a gear portion engaging with the spur gear portion of the annular member mounted to the corrector ring of the corrector ring mounting objective lens along a direction of rotation and a disengagement portion disengaging the gear portion from the spur gear portion of the annular member.

3. A corrector ring driving device of a microscopic objective lens provided with a corrector ring according to claim 2, wherein the connection means controls an amount of rotation of the motor so that when the corrector ring mounting objective lens is introduced into the observation optical path, the gear portion of the turning effort transmitting section engages with the spur gear portion of the annular member mounted to the corrector ring of the corrector ring mounting objective lens, while when the corrector ring mounting objective lens is removed from the observation optical path, the spur gear portion of the annular member mounted to the corrector ring of the corrector ring mounting objective lens is disengaged through the disengagement portion of the turning effort transmitting section.

4. A corrector ring driving device of a microscopic objective lens provided with a corrector ring according to claim 1, wherein the turning effort transmitting section has a rotary roller constructed of an elastic member and the connection means is constructed so that the rotary roller is pressed against the corrector ring of the corrector ring mounting objective lens.

5. A corrector ring driving device of a microscopic objective lens provided with a corrector ring according to claim 4, wherein the turning effort transmitting section has a pressure exerting portion pressed against the corrector ring of the corrector ring mounting objective lens along a direction of rotation and a pressure release portion releasing a pressure on the corrector ring.

6. A corrector ring driving device of a microscopic objective lens provided with a corrector ring according to claim 5, wherein the connection means controls an amount of rotation of the motor so that when the corrector ring mounting objective lens is introduced into the observation optical path, the pressure exerting portion of the turning effort transmitting section is pressed against the corrector ring of the corrector ring mounting objective lens, while when the corrector ring mounting objective lens is removed from the observation optical path, a pressure on the corrector ring of the corrector ring mounting objective lens is released through the pressure release portion of the turning effort transmitting section.

7. A corrector ring driving device of a microscopic objective lens provided with a corrector ring according to claim 1, wherein the rotation driving mechanism is constructed to be mountable and dismountable with respect to each of the mounting and dismounting sections of the objective switching device.

8. A corrector ring driving device of a microscopic objective lens provided with a corrector ring according to claim 1, wherein the rotation driving mechanism is secured to a shaft fixed to the microscope body which is a center of rotation of the objective switching device.

9. A corrector ring driving device of a microscopic objective lens provided with a corrector ring according to claim 1, wherein the rotation driving mechanism is supported by a support independent of the objective switching device.

10. A corrector ring driving device of a microscopic objective lens provided with a corrector ring according to claim 9, wherein the support is constructed of an elastic member fixed to the microscope body.

11. A corrector ring driving device of a microscopic objective lens provided with a corrector ring according to claim 9, wherein the support is constructed to be movable and the connection means has a travel control means malting the support movable with respect to positions where the turning effort transmitting section is connected to, and disconnected from, the corrector ring of the corrector ring mounting objective lens introduced into, and removed from, the observation optical path in association with a switching operation performed by the objective switching device.

12. A corrector ring driving device of a microscopic objective lens provided with a corrector ring which drives the corrector ring of a corrector ring mounting objective lens mounted to an objective switching device having a plurality of mounting and dismounting sections for mounting and dismounting a plurality of kinds of objective lenses, to each of which is mounted the corrector ring mounting objective lens, and allowing a desired objective lens to be introduced into an observation optical path by rotating on a shaft fixed to a microscope body, the corrector ring driving device comprising:

a rotation driving mechanism having a motor and a turning effort transmitting section which transmits a turning effort of the motor to the corrector ring of the corrector ring mounting objective lens mounted to the objective switching device to drive the corrector ring, the rotation driving mechanism being constructed to connect the turning effort transmitting section to the corrector ring of the corrector ring mounting objective lens introduced into the observation optical path in a switching operation performed by the objective switching device and to disconnect the turning effort transmitting section from the corrector ring of the corrector ring mounting objective lens removed from the observation optical path.

13. A corrector ring driving device of a microscopic objective lens provided with a corrector ring according to claim 12, wherein the turning effort transmitting section has a rotary roller constructed of an elastic member and a connection means is constructed so that the rotary roller is pressed against the corrector ring of the corrector ring mounting objective lens.

14. A corrector ring driving device of a microscopic objective lens provided with a corrector ring according to claim 13, wherein the rotation driving mechanism is constructed to be mountable and dismountable with respect to each of the mounting and dismounting sections of the objective switching device.

15. A corrector ring driving device of a microscopic objective lens provided with a corrector ring according to claim 13, wherein the rotation driving mechanism is secured to a shaft fixed to the microscope body which is a center of rotation of the objective switching device.

16. A corrector ring driving device of a microscopic objective lens provided with a corrector ring according to claim 13, wherein the rotation driving mechanism is supported by a support independent of the objective switching device.

17. A corrector ring driving device of a microscopic objective lens provided with a corrector ring according to claim 16, wherein the support is constructed of an elastic member fixed to the microscope body.

* * * * *